US005480735A

United States Patent [19]

Landsman et al.

[11] Patent Number: 5,480,735
[45] Date of Patent: *Jan. 2, 1996

[54] HIGH CURRENT ALKALINE FUEL CELL ELECTRODES

[75] Inventors: Douglas A. Landsman, Hartford, Conn.; Paul A. Plasse, Blandford, Mass.

[73] Assignee: International Fuel Cells Corporation, South Windsor, Conn.

[*] Notice: The term of this patent shall not extend beyond the expiration date of Pat. No. 5,217,821.

[21] Appl. No.: 218,991

[22] Filed: Mar. 29, 1994

Related U.S. Application Data

[63] Continuation of Ser. No. 994,434, Dec. 21, 1992, abandoned, which is a continuation of Ser. No. 927,861, Aug. 10, 1992, abandoned, which is a continuation of Ser. No. 542,934, Jun. 25, 1990, abandoned.

[51] Int. Cl.$^6$ ................................................. H01M 4/86
[52] U.S. Cl. .......................... 429/13; 429/12; 429/42; 204/292; 204/293; 502/101
[58] Field of Search ............................. 429/12, 40, 42; 204/292, 293; 502/101

[56] References Cited

U.S. PATENT DOCUMENTS

| | | | |
|---|---|---|---|
| 3,386,859 | 6/1968 | Biddick | 136/120 |
| 3,393,098 | 7/1968 | Hartner et al. | 429/13 |
| 3,615,847 | 10/1971 | Vanlevgenhage | 429/13 |
| 3,899,354 | 8/1975 | Kordesch | 429/67 |
| 3,979,227 | 9/1976 | Katz et al. | 427/115 |
| 4,177,159 | 12/1979 | Singer | 429/42 |
| 4,362,790 | 12/1982 | Blanchart et al. | 429/42 |
| 4,377,496 | 3/1983 | Solomon | 204/283 |
| 4,407,906 | 10/1983 | Stonehart | 429/42 |
| 4,440,617 | 4/1984 | Solomon | 429/42 |
| 4,810,594 | 3/1989 | Bregoli et al. | 429/42 |
| 4,847,173 | 6/1989 | Mitsunaga et al. | 429/41 |
| 4,931,168 | 6/1990 | Watanabe et al. | 204/284 |
| 4,970,128 | 11/1990 | Itoh et al. | 429/44 |
| 5,217,821 | 6/1993 | Landsmann et al. | 429/13 |
| 5,312,701 | 5/1994 | Khasin et al. | 429/42 |
| 5,318,862 | 6/1994 | Liu et al. | 429/42 |

FOREIGN PATENT DOCUMENTS

| | | |
|---|---|---|
| 0110491 | 6/1984 | European Pat. Off. . |
| 1209249 | 10/1970 | United Kingdom . |

OTHER PUBLICATIONS

Kuwabara, Takeshi, "Fuel Cells", Chemical Abstracts, vol. 102, No. 18, 1984, Columbus, Ohio, Abstract 152252W & JP, A, 59 224 067 (Toshiba Corp) 15 Dec. 1984.

Takeuchi, Seiji et al, "Fuel Cells", Chemical Abbstracts, vol. 107, No. 6, 1987, Columbus Ohio; Abstract 43164B & JP, A, 6 286 662 (Hitachi Ltd) 12 Apr. 1987.

Maoka, Tadanori, "Gas–Diffusion Electrodes", Chemical Abstracts, vol. 102, No. 14, 1984, Columbus Ohio, US; Abstract 116629R & JP, A, 59, 181 463 (Toshiba K.K.) 15 Oct. 1984.

Patent Abstracts of Japan, vol. 12, No. 101 (E–595) (2948) 2 Apr. 1988 & JP, A, 62 232 858 (Tanaka Kikinzoku Kogyo K.K.) 13 Oct. 1987.

*Primary Examiner*—Anthony Mc Farlane

[57] ABSTRACT

Electrodes for an alkaline fuel cell are disclosed. The electrodes include a porous substrate and a catalyst layer supported on the substrate. The catalyst layer includes catalyst particles for catalyzing the electrochemical reaction occurring at the electrode, a hydrophobic binder for providing a network of hydrophobic gas passages communicating with the catalyst particles and hydrophilic catalytically inactive particles for providing a network of liquid transport pathways through the catalyst layer. The liquid transport pathways improve liquid transport through the catalyst layer and electrodes of the present invention provide improved resistance to electrode flooding and electrolyte pumping.

21 Claims, 1 Drawing Sheet

HIGH CURRENT ALKALINE FUEL CELL ELECTRODES

The U.S. Government may have rights in this invention pursuant to Contract no. F 33615-87-C-2278 awarded by the Department of the Air Force. This application is a continuation of Ser. No. 07/994,434, filed Dec. 12, 1992 now abandoned, which is a continuation of Ser. No. 07/927,861, filed Aug. 10, 1992, now abandoned, which is a continuation of Ser. No. 07/542,934, filed Jun. 25, 1990, now abandoned.

TECHNICAL FIELD

The present invention pertains to fuel cell electrodes, and particularly to electrodes for fuel cells having an alkaline electrolyte.

BACKGROUND OF THE INVENTION

A fuel cell is a device for converting chemical energy into electricity. An alkaline fuel cell comprises an anode, a cathode and an alkaline electrolyte held within a porous non-conducting matrix between the anode and the cathode. Potassium hydroxide is typically used as the alkaline electrolyte in an alkaline fuel cell. The anode and cathode each comprise a porous substrate and a porous catalyst layer supported on the substrate.

Conventional alkaline fuel cells are operated at temperatures in the range of 65° C. to 200° C. at pressures between 1 and 14 atmospheres. A hydrogen containing gas is fed to the anode and an oxygen containing gas is fed to the cathode. The reactant gases diffuse through the electrodes to react with the electrolyte in the presence of the catalysts to produce water, heat and electricity. At the anode the hydrogen is electrochemically oxidized and gives up electrons according to the reaction:

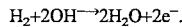

The electrons so generated are conducted from the anode through an external circuit to the cathode. At the cathode electrons are electrochemically combined with the oxidant according to the reaction:

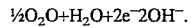

A flow of ions through the electrolyte completes the electrical circuit.

In a conventional gas diffusion electrode, the catalyst layer comprises a polymeric hydrophobic phase and a wettable catalyst phase. Particles of catalyst form a network of electrolyte-filled channels through the catalyst layer. The above described electrochemical reactions occur at the surfaces of the catalyst particles. The porous hydrophobic phase binds the electrode together and provides a network of channels through which reactant gases gain access to the catalytic surfaces and through which gaseous reaction products escape from the catalyst layer.

The performance of a conventional alkaline fuel cell may be compromised by phenomena termed "flooding" and "pumping". The term "flooding" refers to penetration of liquid into hydrophobic regions of the catalyst layer which should contain only gas. The misplaced liquid hinders and may totally obstruct the supply of reactant gas to local regions of the catalyst. As a result, there is an increase in electrode polarization as non-flooded regions of the electrode are forced to carry more current the flooding phenomenon is most prevalent at the water-producing electrode, i.e. the anode of an alkaline electrolyte fuel cell.

The term "pumping" refers to bulk movement of electrolyte from one side of a fuel cell to the other due to the electromigration of nonelectroactive ions. For example, in an alkaline fuel cell having a KOH electrolyte nonelectroactive potassium ions migrate toward the cathode. During operation at high current densities, pressure may be built up that is sufficient to force electrolyte out of the gas side of the cathode. Accumulation of electrolyte on the gas side of the electrode restricts the supply of reactant gas to the catalyst layer of the electrode and may lead to severe concentration polarization of the electrode.

The conventional approach to the problem of flooding has been to make the catalyst layer of the electrode more hydrophobic. The catalyst layer can be made more hydrophobic by increasing the amount of hydrophobic binder in the layer or by increasing the temperature or process time during sintering of the electrode. The pumping phenomenon has been addressed by applying a thin layer of a porous hydrophobic polymer to the gas side of the electrode. These strategies have achieved only limited success.

What is needed in the art is a way to provide electrodes that are resistant to flooding and pumping and to thereby provide an alkaline fuel cell that may be operated continuously at high current density.

SUMMARY OF THE INVENTION

A gas diffusion electrode for conducting an electrochemical reaction in an alkaline fuel cell is disclosed. The electrode comprises a porous substrate and a catalyst layer supported on the substrate. The catalyst layer comprises a catalytically effective amount of catalyst particles for promoting the electrochemical reaction, a porous hydrophobic binder for providing a network of hydrophobic gas pathways communicating with the catalyst particles and hydrophilic particles in an amount effective to provide a network of liquid transport pathways throughout the catalyst layer. The hydrophilic particles are not active in promoting the electrochemical reaction.

A method for making a gas diffusion electrode is also disclosed. The method comprises preparing an aqueous dispersion of catalyst particles and hydrophobic polymer particles, flocculating the dispersion to form a flocculent suspension, mixing hydrophilic particles with the flocculent suspension to form a mixture, filtering the mixture to form a catalyst layer, disposing the catalyst layer on a porous substrate and sintering the catalyst layer to form the electrode.

An alkaline fuel cell and a method for generating electricity are also disclosed.

DETAILED DESCRIPTION OF THE INVENTION

Figure 1:
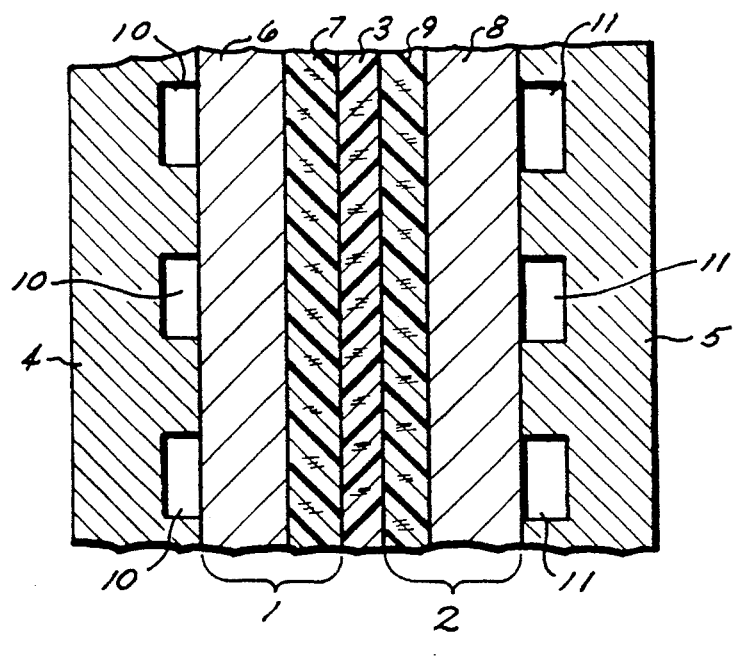
FIG. 1 shows a schematic cross section of an alkaline fuel cell.

Referring to FIG. 1, the fuel cell includes an anode 1, a cathode 2, an electrolyte-filled matrix 3 between the anode 1 and the cathode 2, an anode gas flow field 4 and a cathode gas flow field 5. The anode 1 comprises a substrate 6 and a catalyst layer 7. The cathode 2 comprises a substrate 8 and a catalyst layer 9. The catalyst layers 7 and 9 are each oriented toward the matrix 3. The matrix 3 is a thin porous sheet of an electrically insulating material which holds the alkaline electrolyte within its pores by capillary forces. The anode 1 and cathode 2 are electrically connected by an external circuit (not shown). Gas flow passages 10 and 11 distribute reactant gases over the electrodes.

The electrodes of the present invention each include an electrically conductive porous substrate. The porous substrate may be any substrate conventionally used in alkaline fuel cell electrodes. For example, the porous substrate may comprise gold screen, gold plated perforated metal foil, porous sintered nickel, carbon paper or graphite paper. Preferably, the porous substrate of the electrode of the present invention comprises a gold plated perforated nickel foil substrate.

The electrodes of the present invention each include a catalyst layer supported on the porous substrate. The catalyst layer includes a hydrophobic binder, catalyst particles, and hydrophilic particles.

The hydrophobic binder may comprise any hydrophobic polymer conventionally used for making a catalyst layer in an alkaline fuel cell. Preferably, the hydrophobic binder of the present invention comprises a fluoropolymer. Most preferably the hydrophobic binder comprises polytetrafluoroethylene (PTFE). The catalyst layer may comprise between about 10 weight percent and about 50 weight percent of hydrophobic binder. Preferably, the catalyst layer comprises about 20 weight percent hydrophobic binder.

The catalyst layer of the anode of the present invention includes the particles that catalyze the electrochemical oxidation of hydrogen in an alkaline electrolyte. The catalyst particles of the anode catalyst layer may comprise any material conventionally used as a catalyst in the anode of an alkaline fuel cell. For example, the catalyst particles of the anode catalyst layer may comprise platinum, palladium, rhodium, iridium and mixtures or alloys thereof, either as metal blacks or supported on a chemically inert support. Preferably, the catalyst particles of the anode catalyst layer comprise platinum black or a mixture of platinum black and palladium black. Typically, the anode catalyst particles have a mean specific surface area between about 5 m²/g and 200 m²/g. Preferably, the anode catalyst particles are metal blacks having a surface area between 15 m²/g and 40 m²/g. The anode catalyst layer may comprise between 25 weight percent and 90 weight percent catalyst particles. Preferably, the catalyst layer of the anode comprises between 50 weight percent and 70 weight percent catalyst particles.

The catalyst layer of the cathode of the present invention includes particles that catalyze the electrochemical reduction of oxygen in an alkaline electrolyte. The catalyst particles of the cathode catalyst layer may be particles of any material conventionally used as a catalyst in the cathode of an alkaline fuel cell. For example, the catalyst particles of the catalyst layer may comprise platinum, gold, silver, iridium, rhodium and mixtures or alloys thereof, as metal blacks or supported on an inert support. Typically, the cathode catalyst particles have a mean specific surface area between about 5 m²/g and 100 m²/g. Preferably, the cathode catalyst particles are metal blacks and have a surface area between about 10 m²/g and about 40 m²/g. Most preferably, the cathode catalyst particles comprise a platinum-iridium alloy black comprising 90 weight percent platinum and 10 weight percent iridium. The cathode catalyst layer may comprise between 25 weight percent and about 90 weight percent catalyst particles. Preferably, the catalyst layer of the cathode comprises between about 50 weight percent and about 70 weight percent catalyst particles.

The catalyst layer of an electrode of the present invention includes hydrophilic particles in an amount effective to provide a network of liquid transport pathways throughout the catalyst layer of the electrode. Preferably, the catalyst layer of the electrode of the present invention comprises between about 2.5 weight percent and about 45 weight percent hydrophilic particles.

The hydrophilic particles of the anode of the present invention may be any particles that have a hydrophilic, i.e. wettable by water, surface and that are stable in an alkaline electrolyte under the operating conditions of the anode. Suitable hydrophilic particles include, e.g. gold, silver and alloys thereof, as well as potassium titanate, carbon black, graphite black and each of the materials disclosed above as being suitable as anode catalyst particles. Preferably, the hydrophilic particles of the anode catalyst layer comprise carbon black or a gold-platinum alloy black. Most preferably, the hydrophilic particles of the anode catalyst layer comprise a gold-platinum alloy black comprising about 90 weight percent gold and about 10 weight percent platinum.

The hydrophilic particles of the cathode catalyst layer may comprise any particles that have hydrophilic surfaces and that are stable in an alkaline electrolyte under the operating conditions of the cathode. Suitable hydrophilic particles include, e.g. certain ceramic materials, spinels, (e.g. nickel-cobalt spinel) perovskites and pyrochlores, nickel oxide, potassium titanate and each of the materials disclosed above as being suitable as cathode catalyst particles. Preferably, the hydrophilic particles of a particular cathode catalyst layer of the present invention comprise the same material as the catalyst particles of the particular cathode catalyst layer.

Figure 2:
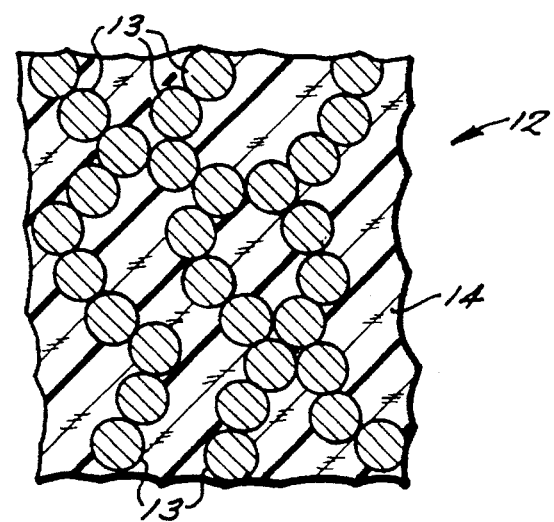
FIG. 2 shows a schematic diagram of a portion of a catalyst layer of a conventional electrode.

A schematic diagram of a portion of the catalyst layer 12 of a conventional electrode is shown in FIG 2. The layer 12 includes catalyst particles 13 and a hydrophobic binder 14 which provides a network of gas pathways communicating with the catalyst particles 13.

Figure 3:
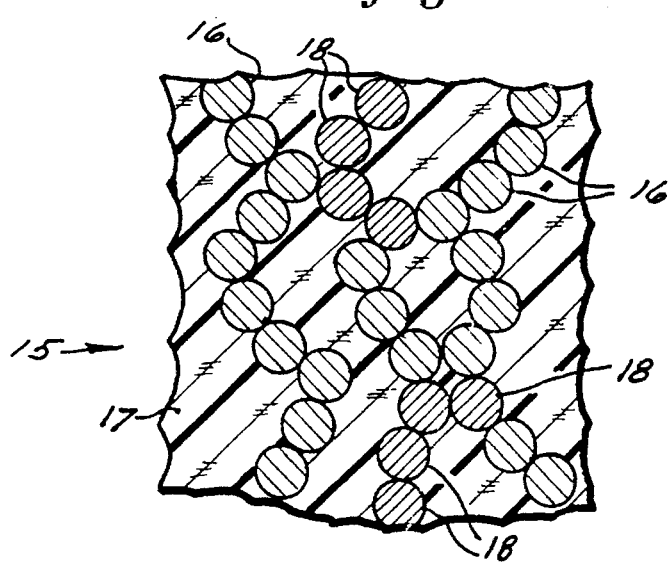
FIG. 3 shows a schematic diagram of a portion of a catalyst layer of an electrode of the present invention.

A schematic diagram of a portion of a catalyst layer 15 of an electrode of the present invention is shown in FIG. 3. The layer 15 includes catalyst particles 16 associated with a porous hydrophobic binder 17 which provides a network of hydrophobic gas pathways communicating with the catalyst particles 16. Hydrophilic particles 18 are distributed throughout the layer 15 to form an interpenetrating network of liquid transport pathways throughout the catalyst layer 15.

As is the case in conventional electrodes, the surfaces of the catalyst particles of the electrode of the present invention are associated with the hydrophobic binder to control the wettability of the surfaces of the catalyst particles, i.e. to provide hydrophobic pathways to the surfaces of the catalyst particles for gas transport. Typically, this is accomplished by flocculating a dispersion of the hydrophobic binder and catalyst particles.

In contrast, the hydrophilic particles of the present invention are incorporated into the catalyst layer in a manner which maintains the wettability of the surfaces of the hydrophilic particles. One method for incorporating hydrophilic particles into a catalyst layer while maintaining the wettability of the surfaces of the hydrophilic particles is described below.

The process of the present invention is one method of providing an electrode having the desired composition and structure. In the process of the present invention catalyst particles and hydrophobic binder particles are dispersed in water and the dispersion is caused to flocculate to form a flocculent aqueous suspension. Hydrophilic particles are stirred rapidly into the flocculent aqueous suspension and the mixture so formed is immediately filtered to form a catalyst layer. The catalyst layer is transferred to a suitable porous substrate. The catalyst layer and substrate are dried and sintered to form the electrode. A small amount, e.g. from about 5 to about 10 weight percent based on the combined weight of added hydrophobic binder and hydrophilic particles, of polymer i.e. binder, may be added to the flocculent suspension along with the hydrophilic particles to more securely bind the hydrophilic particles into the catalyst layer without rendering the surfaces of the hydrophilic particles hydrophobic.

The hydrophilic particles of the present invention make no significant contribution to the current generated within the catalyst layer, i.e. are substantially inactive in catalyzing the electrochemical reaction occurring at the electrode under the operating conditions of the cell. The hydrophilic particles form a network of liquid transport pathways throughout the catalyst layer. During operation of the cell, liquid flows along the pathways and the hydrophilic particles are "flooded", i.e. substantially surrounded by liquid. Since the liquid surrounding the particles hinders transport of gaseous reactants to the surfaces of the hydrophilic particles, the hydrophilic particles are substantially inactive in the electrochemical reaction occurring at the electrode, even in embodiments of the present invention wherein the hydrophilic particles comprise a material that is catalytically active in the reaction occurring at an electrode that includes the hydrophilic particles.

The hydrophilic particles of the electrode of the present invention provide a network of wettable surfaces throughout the catalyst layer. Since the hydrophilic particles of the electrode are not active in promoting the electrochemical reaction occurring at the surfaces of the catalyst particles of the electrode, i.e. the hydrophilic particles make no substantial contribution to water generation at the anode or to hydroxyl ion generation at the cathode, the network of wettable surfaces provided by the hydrophilic particles functions primarily as a passive network of liquid transport pathways.

EXAMPLE 1

An anode (A1) according to the present invention was fabricated according to the method of the present invention. A catalyst suspension was formed by ultrasonically codispersing 1.92 g platinum black (fuel cell grade from Englehard Corp.) and 0.22 g palladium black (Johnson Matthey Inc.) in distilled water. A hydrophobic binder (0.715 g polytetrafluoroethylene) was added to the catalyst suspension in the form of a diluted aqueous dispersion of TFE-3170 (DuPont). The catalyst/PTFE mixture so formed was blended ultrasonically. The catalyst/PTFE mixture was flocculated by adding aluminum ions to the mixture and adjusting the pH of the mixture. Hydrophilic particles (0.72 g of 90:10/Au:Pt alloy black) were added to the flocculated catalyst/PTFE suspension with rapid stirring. The catalyst/PTFE/second particle mixture was filtered and press transferred onto a gold plated 100 mesh nickel screen to form an electrode having an active area of 131 cm². The electrode so formed was leached with isopropanol, rinsed with water, dried at 200° F. and sintered at 650° F. for 10 minutes.

A conventional anode (A2) was fabricated by a process analogous to the process of the present invention, except that the step of adding hydrophilic particles to the flocculated catalyst particle/PTFE suspension was omitted. Catalyst particles (1.92 g platinum black and 0.22 g palladium black) were ultrasonically dispersed in distilled water. A hydrophobic binder (0.535 g PTFE in the form of a diluted aqueous dispersion of TFE-3170 (DuPont)) was added to the catalyst dispersion. The catalyst/PTFE mixture was flocculated, filtered and press transferred onto a 100 mesh gold plated nickel screen to form an electrode. The electrode was sintered at 590° F. for 5 minutes.

Anodes A1 and A2 were operated for over 2 hours at 200 psia, and 3500 amp/ft² in identical $H_2/O_2$ fuel cells, using 40 weight percent KOH as the electrolyte. The cells were disassembled and the polarizations and limiting currents of the anodes were determined in a half cell apparatus as a function of current density. The values obtained and comparable results obtained from testing unused portions of the same electrodes are given in Table 1.

TABLE I

| ANODE | POLARIZATION (mv)[1] | | LIMITING CURRENT[2] |
|---|---|---|---|
| | @ 400 mA/cm² | @ 1000 mA/cm² | |
| A1 pre-test | 18 | 47 | 412 mA/cm² |
| A1 post-test | 17 | 45 | 400 mA/cm² |
| A2 pre-test | 12 | 30 | 450 mA/cm² |
| A2 post-test | 22 | 80 | 140 mA/cm² |

[1] 100% $H_2$ at 14.7 psia in 35 weight percent KOH at 158° F.
[2] 4% $H_2$:96% He The anode (A1) of the present invention exhibited no increase in polarization following operation in the fuel cell whereas the conventional anode (A2) exhibited a substantial increase in polarization, particularly at the higher current density. The limiting current of the anode of the present invention was substantially unchanged, while the post test limiting current of the conventional electrode was substantially lower than its pretest limiting current. The results indicate that the anode of the present invention offers improved resistance to flooding.

EXAMPLE 2

A cathode (C1) of the present invention was fabricated according to the method of the present invention.

Catalyst particles (2.80 g of 90:10/Pt:Ir alloy black) were dispersed ultrasonically in 75 ml distilled water. A hydrophobic binder (0.70 g PTFE in the form of a diluted aqueous dispersion of TFE-30 (DuPont)) was added to the catalyst dispersion and blended ultrasonically. Aluminum ions were added and the pH of the catalyst/PTFE dispersion was adjusted to flocculate the catalyst/PTFE dispersion. Hydrophilic particles (0.65 g of 90:10/Pt:Ir alloy black) were rapidly stirred into the flocculated catalyst/PTFE suspension. The catalyst particle/PTFE/hydrophilic particle mixture was vacuum filtered and the damp filter cake was press transferred on to a 0.003 inch thick, gold-plated, perforated nickel foil to form an electrode having an active area of 131 cm². The electrode was vacuum dried, heated to volatilize the surfactant introduced with the TFE-30 dispersion and then sintered at 610° F. for 10 minutes. A conventional cathode (C2) was fabricated by a conventional process analogous to the process of the present invention, except that the step of adding the hydrophilic particles to the flocculated catalyst particle/PTFE suspension was omitted.

Cathodes C1 and C2 were operated in identical $H_2/O_2$ fuel cells at 200 psia and 250° F. using 40 weight percent KOH as the electrolyte. Each of the cells included anodes of the present invention as described in Example 1, i.e. identical to electrode A1. The results of the testing are given in TABLE II.

TABLE II

| CATHODE | CELL PERFORMANCE (mv) @ 3500 ASF | | | | |
|---|---|---|---|---|---|
| | 0 hr | 2 hr | 4 hr | 8 hr | 10 hr |
| C1 | 838 | 837 | 835 | 832 | 830 |
| C2 | 830 | 812 | 805 | — | — |

The cell including the cathode (C1) of the present invention exhibited higher performance and substantially improved stability compared to the cell including the conventional cathode (C2).

The flooding and pumping phenomena arise from the limited rate at which conventional fuel cell electrodes are able to transport liquids.

Flooding occurs when the rate at which water is generated in the anode reaction exceeds the rate at which the water can be transported away from the catalytic surfaces of the anode catalyst layer.

Pumping occurs when hydroxyl ions are generated at a rate that is higher than that at which the hydroxyl ions can be transported from the catalyst layer of the cathode. The resultant concentration gradient forces potassium ions to migrate to the cathode and gives rise to the pumping phenomenon.

The hydrophilic particles of the particles of the electrode of the present invention provide catalytically inactive conduits for liquid transport through the catalyst layer. Improving the ability of the fuel cell electrode to transport liquid directly addresses the causes of the flooding and pumping problems experienced with conventional electrodes and results in substantial improvement in electrode performance. Anodes of the present invention are resistant to flooding, even when operated at high current densities. Cathodes of the present invention are resistant to pumping, even when operated at high current densities.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. An electrode for conducting an electrochemical reaction in a fuel cell, comprising:

a gas and liquid permeable porous substrate having two major surfaces; and a porous catalyst layer supported on one of said major surfaces of the substrate, including a flocculated combination of a catalytically effective amount of catalyst particles that are catalytically active in promoting the electrochemical reaction and a hydrophobic binder forming a network of hydrophobic gas transport pathways that establish communication between the substrate pores and the catalyst particles, the improvement comprising:

hydrophobic particles substantially catalytically inactive in promoting electrochemical oxidation of hydrogen hydrophilic particles said forming hydrophilic liquid transport pathways in an interpenetrating relationship with said network of hydrophobic gas transport pathways, wherein said hydrophilic liquid transport pathways enhance transport of aqueous liquid throughout the catalyst layer.

2. The electrode of claim 1, wherein the catalyst layer comprises:

from about 10 weight percent to about 50 weight percent hydrophobic binder;

from about 25 weight percent to about 90 weight percent catalyst particles; and from about 2.5 weight percent to about 45 weight percent hydrophilic particles.

3. The electrode of claim 1, wherein the electrode comprises an anode, the electrochemical reaction comprises electrochemically oxidizing hydrogen in an alkaline electrolyte and the anode is resistant to concentration polarization during operation at high current densities.

4. The electrode of claim 3, wherein the catalyst particles each comprise a chemically inert support and a metal chosen from the group consisting of platinum, iridium, palladium, rhodium, nickel and alloys thereof dispersed on the support.

5. The electrode of claim 3, wherein the catalyst particles comprise a metal black chosen from the group consisting of platinum, iridium, palladium, rhodium, nickel and alloys thereof.

6. The electrode of claim 3, wherein hydrophilic particles comprise a material chosen for the group consisting of gold and alloys thereof, silver and alloys thereof, potassium titanate, carbon black and graphitized carbon black.

7. The electrode of claim 6, wherein the hydrophilic particles comprise a gold-platinum alloy.

8. The electrode anode of claim 3, wherein the catalyst particles comprise a mixture of 90 weight percent platinum black and 10 weight percent palladium black, and hydrophilic particles comprise a gold-platinum alloy, said alloy comprising about 90 weight percent gold and about 10 weight percent platinum.

9. The electrode of claim 1, wherein the electrode comprises a cathode and the electrochemical reaction comprises electrochemically reducing oxygen in an alkaline electrolyte and the cathode is resistant to electrolyte pumping.

10. The electrode of claim 9, wherein the catalyst particles comprise a metal chosen from the group consisting of platinum, gold, silver, iridium, rhodium and alloys thereof.

11. The electrode of claim 9, wherein the catalyst particles comprise a metal black chosen from the group consisting of platinum, gold, silver, iridium, rhodium and alloys thereof.

12. The electrode of claim 9, wherein the hydrophilic particles comprise a material chosen from the group consisting of nickel oxide, potassium titanate, platinum, gold, silver, iridium, rhodium and alloys of platinum, gold, silver, iridium and rhodium.

13. The electrode of claim 9, wherein the catalyst particles and the hydrophilic particles each comprise an alloy black of 90 weight percent platinum and 10 weight percent gold.

14. The electrode of claim 1, wherein said hydrophilic particles have surfaces wettable by water and wherein the hydrophilic particles are incorporated into the catalyst layer in a manner which maintains the wettability of the surfaces of the hydrophilic particles.

15. A method of making a gas diffusion electrode, comprising the steps of preparing an aqueous dispersion of catalyst particles and hydrophobic binder;

flocculating the dispersion to form a flocculent suspension;

mixing substantially catalytically inactive hydrophilic particles with the flocculent suspension to form a mixture;

filtering the mixture to form a catalyst layer;

disposing the catalyst layer on a porous substrate; and sintering the catalyst layer on said substrate to form the electrode, said electrode having interpenetrating networks of hydrophobic gas transport pathways and of hydrophilic liquid transport pathways, said hydrophobic gas transport pathways being formed by said catalyst particles dispersed in said hydrophobic binder, and said hydrophilic liquid transport pathways being formed by said hydrophilic particles.

16. A electrode made by the process of claim 15.

17. A method for generating electricity, comprising:

electrochemically oxidizing a fuel stream at an anode to generate a stream of electrons, said anode comprising:

a porous anode substrate;

an anode catalyst layer dispersed on the substrate, said anode catalyst layer comprising first and second interpenetrating fluid transport networks, said first fluid transport network comprising:

a flocculated combination of catalytically effective amount of first catalyst particles, said first catalyst particles being catalytically active in promoting electrochemical oxidation of hydrogen in an alkaline electrolyte; and a porous hydrophobic binder for providing an interconnecting system of hydrophobic gas pathways, said gas transport pathways communicating with the first catalyst particles; and said second fluid transport network comprising:

first hydrophilic particles in an amount effective to provide an interconnecting system of hydrophilic liquid transport pathways throughout the anode catalyst layer, said first hydrophilic particles being substantially inactive in promoting the electrochemical oxidation of hydrogen in the alkaline electrolyte;

conducting the electrons to a cathode, said cathode comprising:

a porous cathode substrate;

a cathode catalyst layer dispersed on the substrate, said cathode catalyst layer comprising third and fourth interconnecting fluid transport networks, said third fluid transport network comprising:

a flocculated combination of catalytically effective amount of second catalyst particles, said second catalyst particles being catalytically active in promoting electrochemical reduction of oxygen in an alkaline electrolyte, and a porous hydrophobic binder for providing an interconnecting system of hydrophobic gas pathways communicating with the second catalyst particles; and said fourth fluid transport network comprising:;

second hydrophilic particles in an amount effective to provide an interconnecting system of hydrophilic liquid transport pathways throughout the cathode catalyst layer, said second hydrophilic particles being substantially inactive in promoting electrochemical reduction of oxygen in the alkaline electrolyte; and electrochemically reducing oxygen at the cathode while simultaneously electrochemically oxidizing hydrogen at the anode.

18. The method of claim 17, wherein said first hydrophilic particles having surfaces wettable by water and wherein the first hydrophilic particles are incorporated in the catalyst layer in a manner which maintains the wettability of the surfaces of the first hydrophilic particles; and said second hydrophilic particles having surfaces wettable by water and wherein the second hydrophilic particles are incorporated in the catalyst layer in a manner which maintains the wettability of the surfaces of the second hydrophilic particles.

19. An alkaline fuel cell, said fuel cell comprising:

at least two electrodes, at least one of said electrodes comprising a porous substrate having a flocculated combination of catalyst layer thereon, said catalyst layer having catalyst particles and hydrophobic binder which form hydrophobic gas transport pathways, and hydrophilic particles which are inactive in promoting electrochemical oxidation of hydrogen, which form hydrophilic liquid transport pathways, wherein said hydrophilic liquid transport pathways are in an interpenetrating relationship with said hydrophobic gas transport pathways; and an alkaline electrolyte filled matrix interposed between said electrodes.

20. The fuel cell of claim 19, wherein said first hydrophilic particles having surfaces wettable by water and wherein the first hydrophilic particles are incorporated in the catalyst layer in a manner which maintains the wettability of the surfaces of the first hydrophilic particles; and said second hydrophilic particles having surfaces wettable by water and wherein the second hydrophilic particles are incorporated in the catalyst layer in a manner which maintains the wettability of the surfaces of the second hydrophilic particles.

21. An alkaline fuel cell as in claim 19 wherein each of at least two of said electrodes comprises a porous substrate having a catalyst layer thereon, said catalyst layer having a flocculated combination of catalyst particles and hydrophobic binder which form hydrophobic gas transport pathways, and hydrophilic particles which are inactive in promoting electrochemical oxidation of hydrogen, which form hydrophilic liquid transport pathways, wherein said hydrophilic liquid transport pathways are in an interpenetrating relationship with said hydrophobic gas transport pathways.

* * * * *